Oct. 22, 1968 P. E. OBERG 3,406,659

MAGNETIC MASK FIELD INDUCED ANISOTROPY

Filed Nov. 29, 1967 4 Sheets-Sheet 1

INVENTOR
PAUL E. OBERG

BY Kenneth T. Grace
ATTORNEY

MAGNETIC MASK FIELD INDUCED ANISOTROPY

Filed Nov. 29, 1967 4 Sheets-Sheet 2

INVENTOR
PAUL E. OBERG
BY Kenneth T. Grace
ATTORNEY

Oct. 22, 1968 P. E. OBERG 3,406,659

MAGNETIC MASK FIELD INDUCED ANISOTROPY

Filed Nov. 29, 1967 4 Sheets-Sheet 3

INVENTOR
PAUL E. OBERG

BY Kenneth T. Grace

ATTORNEY

MAGNETIC MASK FIELD INDUCED ANISOTROPY

Filed Nov. 29, 1967 4 Sheets-Sheet 4

INVENTOR
PAUL E. OBERG
BY Kenneth T. Grace
ATTORNEY 3,406,659
MAGNETIC MASK FIELD INDUCED ANISOTROPY Paul E. Oberg, Minneapolis, Minn., assignor to Sperry Rand Corporation, New York, N.Y., a corporation of Delaware Filed Nov. 29, 1967, Ser. No. 686,601
9 Claims. (Cl. 118—505)

ABSTRACT OF THE DISCLOSURE

Apparatus for defining the easy axis distribution, i.e., the magnetic field anisotropy orientation, of a magnetizable element by orienting magnetic fields provided by magnetizable material that is locally associated with the element rather than by gross externally applied electromagnetic fields.

BACKGROUND OF THE INVENTION

The present invention relates to the metal treating art and in its preferred embodiment to the generation of memory elements of thin-ferromagnetic-film layers having magnetic field anisotropy. See the publication, "Thin Ferromagnetic Films," A. C. Moore, IRE Transactions on Component Parts, March 1960, pp. 3–14. Such layers when produced in a vacuum deposition environment with an externally applied electromagnetic field parallel to the plane of the layer obtain the property of uniaxial anisotropy providing a single average easy axis along which the remanent magnetization M thereof lies in a first or in a second and opposite direction. In a digital computer these magnetic orientations may represent the storage of a "1" or of a "0" therein. Such layers when in the order of 100 to 3,000 angstroms (A.) in thickness have single domain properties and when subjected to the proper drive fields may have their magnetization M rotated, or switched, as a magnetic domain in a coherent or noncoherent manner providing very rapid alteration of the direction of the magnetization of the layer. This rapid alteration of the direction of the magnetization of the layer produces an external magnetic field which when coupled to an associated conductor produces an output signal therein that is indicative of the magnetic, or informational, state of the interrogated or sensed layer. Such layers may be produced by any of many well known methods including that of the S. M. Rubens Patent No. 2,900,282, packaged in multiple layer arrays in accordance with the S. M. Rubens et al. Patent No. 3,155,561 and operated in the domain rotational mode in accordance with the S. M. Rubens et al. Patent No. 3,030,-612. Multiple layer elements such as disclosed in the John M. Gorres et al. patent application, Serial No. 645,729, filed June 13, 1967, assigned to the Sperry Rand Corporation as is the present invention, may be generated in a continuous vacuum deposition apparatus such as disclosed in the Charles J. Bukkila et al. patent application Serial No. 547,619, filed May 4, 1966, assigned to the Sperry Rand Corporation as is the present invention, whereby a plurality of layers of differing materials may be fabricated in a continuous series of discrete deposition steps utilizing a plurality of layer defining masks.

Such prior art arrangements producing in a vacuum deposition environment thin-ferromagnetic-film layers utilized a gross externally applied electromagnetic field for the generation of uniaxial anisotropy in such layers whereby there is provided a single preferred or easy axis of magnetization in the plane of the layer whereby the remanent magnetization M may be oriented in a first or a second and opposite direction along such easy axis for the storage of information therein. Such gross externally applied electromagnetic fields have, due to spatial variations of such orienting field over the area of the deposited layers, and due to the influence of adjacent layers, produced planar matrix arrays of such layers wherein the layers in the different areas of the orienting field have different and unknown oriented easy axes. As the inductively associated drive and sense lines are usually printed circuit members having their longitudinal axes oriented with a particular relationship with the assumed easy axes of the layers in the array, variations in the orientation of such easy axes may produce varying and erroneous informational states and indications thereof. Thus, it is highly desirable that the easy axes of all layers of the array be established in the same and known orientation whereby such layers may be utilized to their maximum efficiency.

SUMMARY OF THE INVENTION

The present invention relates to methods of and apparatus for producing in a vacuum deposition environment thin-ferromagnetic-film layers having preferred axes of magnetization that are determined by orienting fields provided by magnetizable elements that are associated with each of the layers.

The thin-ferromagnetic-film layers of the preferred embodiment have single domain properties although such is not required by the present invention. The term "single domain property" may be considered the magnetic characteristic of a three-dimensional element of magnetizable material having a thin dimension that is substantially less than the width and length thereof wherein no magnetic domain walls can exist parallel to the large surface of the element. The term "magnetizable" material shall designate a substance having a remanent magnetic flux density that is substantially high, i.e., approaches the flux density at magnetic saturation. By providing local, i.e., associated with each particular thin-ferromagnetic-film layer, means for establishing a local orienting magnetic field, the local easy axis of magnetization of the associated thin-ferromagnetic-film layer is controlled as a function of position across the layer to a highly accurate degree. Further, it is possible to provide within the same planar array of thin-ferromagnetic-film layers; layers that have differing axes of magnetization. Accordingly, it is a primary object of the present invention to provide a method of and apparatus for producing magnetizable layers having preferred axes of magnetization determined by locally associated magnetizable material.

DESCRIPTION OF THE PREFERRED EMBODIMENTS

Figure 1:
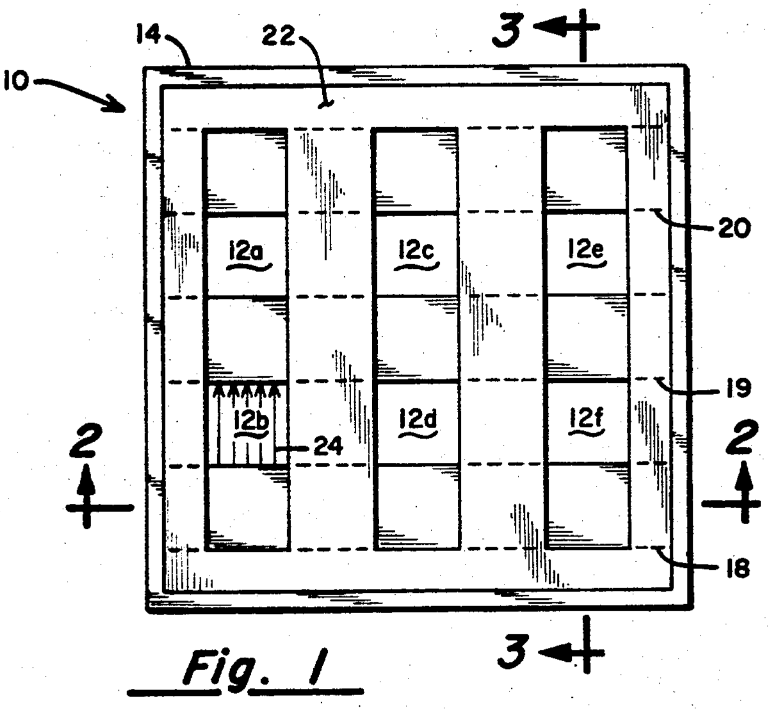
FIG. 1 is an illustration of a first preferred embodiment of the present invention.

FIG. 1 is an illustration of a first preferred embodiment of the present invention wherein there is provided a mask assembly 10 for defining the planar contour of the thin-ferromagnetic-film layers 12 when utilized in a vapor deposition system. Mask assembly 10 includes nonmagnetizable base 14, glass substrate 16, magnetizable strips 18, 19, 20 for providing the local orienting fields in the areas of thin-ferromagnetic-film layers 12 and a nonmagnetizable mask 22. Mask assembly 10 essentially consists of a first group of parallel strips of nonmagnetizable material superposed a second group of parallel strips of magnetizable material, each group oriented orthogonal to each other wherein the spaces between the two groups of parallel strips define the areas on substrate 16 on which the layers 12 are to be deposited with base 14 utilized to establish the proper orientation of the supported parts. This arrangement provides a parallel orienting field 24 extending across thin-ferromagnetic-film layers 12 from strip 18 to the opposing edge of strip 19 as particularly illustrated with respect to layer **12*b***.

Figure 2:
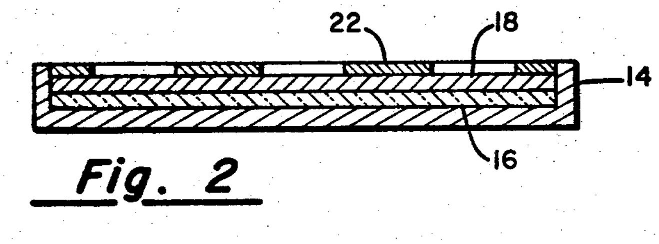
FIG. 2 is an illustration of a cross-sectional view of the embodiment of FIG. 1 taken along axis 2—2.

With particular reference to FIG. 2 there is presented an illustration of a cross-sectional view of the embodiment of FIG. 1 taken along axis 2—2 to illustrate the superposed relationship of the elements of assembly 10. This view particularly illustrates base 14 as having an upwardly extending flange around the periphery thereof for locating substrate 16, magnetizable strips 18, 19, 20 and nonmagnetizable mask 22. In this embodiment nonmagnetizable mask 22 has a plurality of channels on its bottom surface the depth of which is sufficient to contain magnetizable strips 18, 19, 20 while yet nesting on the top surface of substrate 16.

Figure 3:
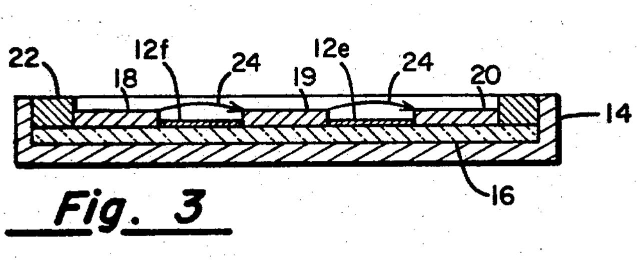
FIG. 3 is an illustration of a cross-sectional view of the embodiment of FIG. 1 taken along axis 3—3.

With particular reference to FIG. 3 there is presented an illustration of a cross-sectional view of the embodiment of FIG. 1 taken along axis 3—3 to illustrate the horizontal relationship of the elements of assembly 10. This view particularly illustrates magnetizable strips 18, 19, 20 nesting upon the top surface of substrate 16 whereby the edges between adjacent strips 18, 19 and 19, 20 define one planar dimension of thin-ferromagnetic-film layers 12. This view further schematically illustrates the magnetic field 24 passing between opposing edges of adjacent magnetizable strips 18, 19 and 19, 20 whereby there are provided the local orienting fields 24 in the areas of thin-ferromagnetic-film layers 12 for establishing the easy axes thereof in a substantially parallel direction.

Figure 4:
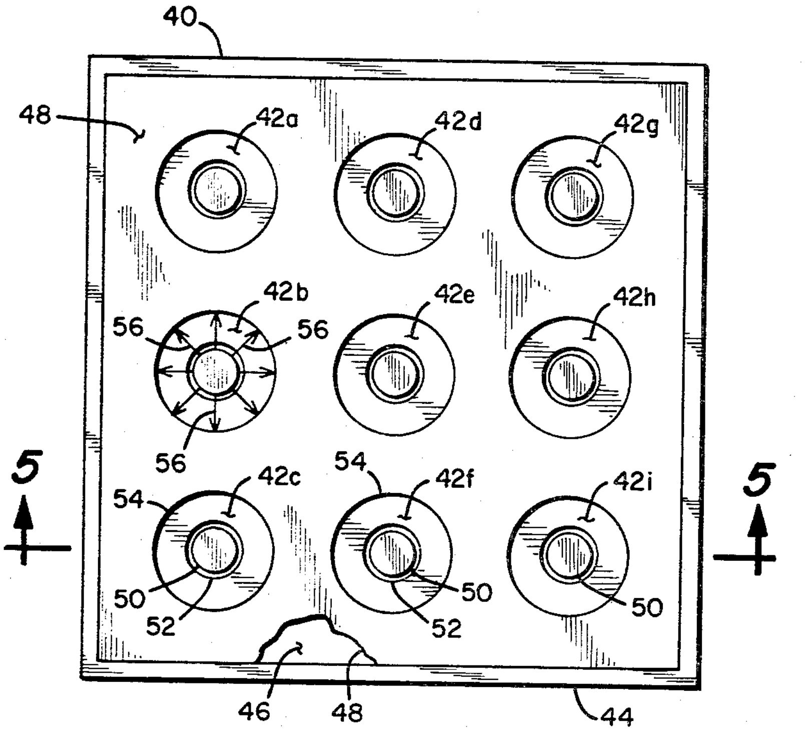
FIG. 4 is an illustration of a second preferred embodiment of the present invention.

With particular reference to FIG. 4 there is presented an illustration of a second preferred embodiment of the present invention wherein there is provided a mask assembly 40 for defining the planar contour of the thin-ferromagnetic-film layers 42 when utilized in a vapor deposition system. Mask assembly 40 includes nonmagnetizable base 44, glass substrate 46, and mask 48 preferably of a high permeability material. Mask assembly 40 essentially consists of a magnetizable base member 44 having a plurality of posts 50 rising from the top surface thereof. Upon the top surface of magnetizable base 44 and having an outside periphery conforming to the upwardly extending flanges of magnetizable base 44 and around the periphery thereof and with a plurality of circular apertures 52 therethrough conforming to the pattern of the posts 50 in magnetizable base 44 is substrate 46. Superposed substrate 46 upon magnetizable base 44 there is provided a high permeability mask 48 having an outside periphery similar to that of substrate 46 and a plurality of apertures 54 therethrough for defining the outside periphery of the thin-ferromagnetic-film layers 42. As can be seen the thin-ferromagnetic-film layers 42 produced by mask assembly 40 are washer-shaped having an outside periphery defined by the apertures 54 in mask 48 and an inside periphery defined by the apertures 52 in substrate 46. This arrangement provides a radially extending local orienting field 56 in the areas of thin-ferromagnetic-film layers 42, as particularly illustrated with respect to layer **42*b***.

Figure 5:
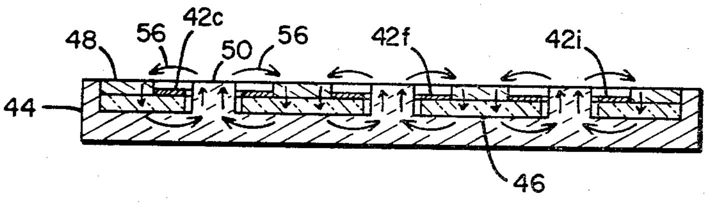
FIG. 5 is an illustration of a cross-sectional view of the embodiment of FIG. 4 taken along axis 5—5.

With particular reference to FIG. 5 there is presented an illustration of a cross-sectional view of the embodiment of FIG. 4 taken along axis 5—5 to illustrate the superposed relationship of the elements of assembly 40 and the flux paths followed by radial orienting field 56. This view particularly illustrates the manner in which the external and internal peripheries of thin-ferromagnetic-film layers 42 are defined by aperture 54 in mask 48 and aperture 52 in substrate 46, respectively.

Figure 6:
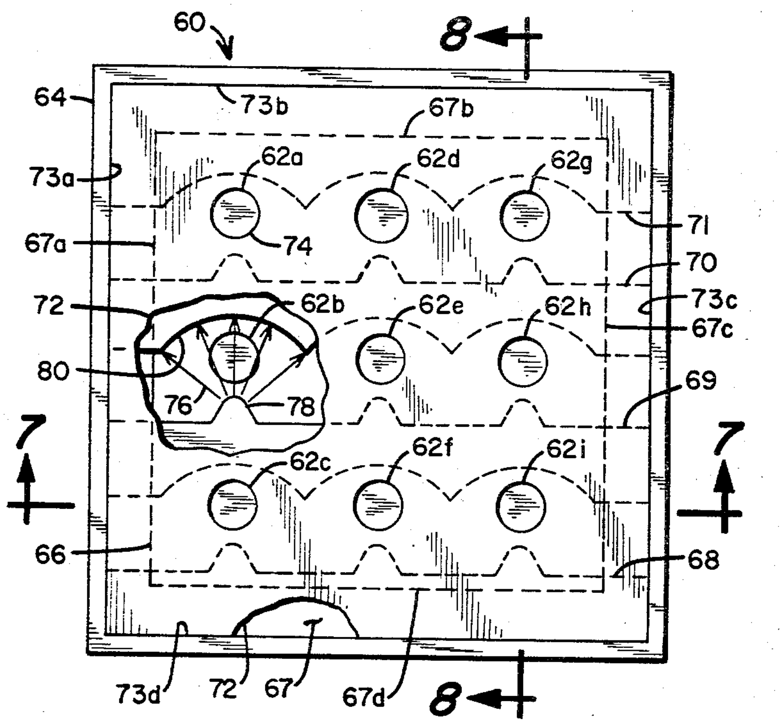
FIG. 6 is an illustration of a third preferred embodiment of the present invention.

With particular reference to FIG. 6 there is presented an illustration of a third preferred embodiment of the present invention wherein there is provided a mask assembly 60 for defining the planar contour of the thin-ferromagnetic-film layers 62 when utilized in a vapor deposition system. Mask assembly 60 includes a nonmagnetizable base 64, glass substrate 66, magnetizable strips 68, 69, 70, 71 for providing the local orienting fields in the areas of thin-ferromagnetic-film layes 62 and a nonmagnetizable mask 72. Mask assembly 60 essentially consists of a nomagnetizable base 64 having an upwardly extending flange about its periphery the inside contour of which provides the means whereby the elements of mask assembly 60 are properly oriented with respect to each other. Mask assembly 60 consists of nonmagnetizable base 64 and located on the top surface thereof of glass substrate 66. Substrate 66 is oriented on the top surface of base 64 by shoulders 67 which define the planar periphery of substrate 66. Upon substrate 66 and within mating channel-like depressions in the top surfaces of shoulders **67*a*, 67*c* are located magnetizable strips 68, 69, 70, 71. On top of the top surface of magnetizable layers 68, 69, 70, 71 is located nonmagnetizable mask 72 which has an outside periphery conforming to the shoulders 73 defined by the upward extending flanges of base 64. Mask 72 has a plurality of apertures 74 therethrough for defining the contour of the associated plurality of thin-ferromagnetic-film layers 62**.

Opposing edges of adjacent magnetizable strips 68, 69 and 69, 70 and 70, 71 are provided with particular contours in the areas of apertures 74 in mask 72 for providing a radial field as the local orienting field 76 in the areas of thin-ferromagnetic-film layers 62. With particular reference to the cutaway view of thin-ferromagnetic-film layer **62*b* there is illustrated the radial orienting field 76 flowing from the circular contour surface 78 of magnetizable strip 69 to the circular contour surface 80 of the magnetizable strip 70. In this embodiment surfaces 78 and 80 are arcs of concentric circles whereby the orienting field 76 is a true radial field emanating from surface 78 across thin-ferromagnetic-film layer 62*b* and into surface 80 of strip 70. This arrangement provides in thin-ferromagnetic-film layer 62*b* a constantly varying angular easy axis dispersion whereby there might be achieved thin-ferromagnetic-film layers 62 having an irreversible switching characteristic that is substantially linear over 90 percent of the total switchable flux. Such an irreversible switching characteristic is more fully defined in the copending patent application of Robert A. White et al., Serial No. 456,365, filed May 18, 1965, assigned to the Sperry Rand Corporation as is the present invention, wherein thin-ferromagnetic-film layers such as layer 62** are utilized to store discrete levels of sampled data as a function of the degree of rotation of the layers' magnetization when subjected to coincident longitudinal and transverse drive field switching components.

Figure 7:
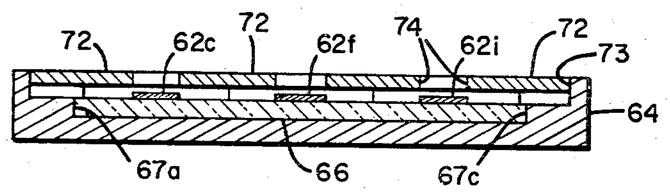
FIG. 7 is an illustration of a cross-sectional view of the embodiment of FIG. 6 taken along axis 7—7.

With particular reference to FIG. 7 there is presented an illustration of a cross-sectional view of the embodiment of FIG. 6 taken along axis 7—7 to illustrate the superposed relationship of the elements of mask assembly 60. This view is particularly presented to illustrate the manner in which substrate 66 and mask 72 are oriented in base 62 by shoulders 67 and 73, respectively. Additionally, there is illustrated the manner in which apertures 74 in mask 72 define the periphery of the thin-ferromagnetic-film layers 62.

Figure 8:
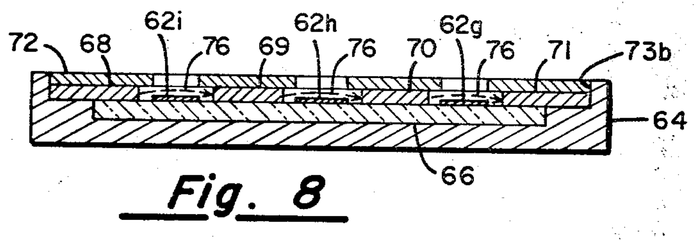
FIG. 8 is an illustration of a cross-sectional view of the embodiment of FIG. 6 taken along axis 8—8.

With particular reference to FIG. 8 there is presented an illustration of a cross-sectional view of the embodiment of FIG. 6 taken along axis 8—8 to illustrate the superposed relationship of the elements of mask assembly 60. This view particularly illustrates the orientation of substrates 66 and mask 72 by shoulder 67 and 73, respectively in base 64. Further, the orienting fields 76 are shown as passing through the areas of thin-ferromagnetic-film layers 62 from opposing edges of adjacent magnetizable strips 68, 69 and 69, 70 and 70, 71.

Figure 9:
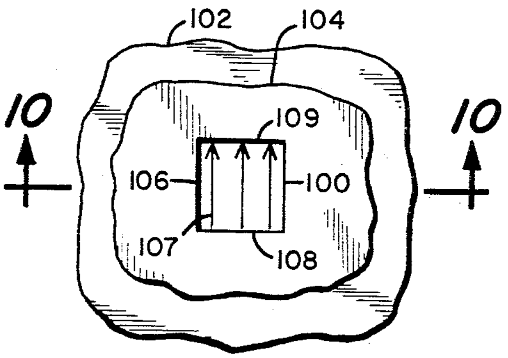
FIG. 9 is an illustration of a fourth preferred embodiment of the present invention showing only an enlarged detail of the area of one thin-ferromagnetic-film layer.

With particular reference to FIG. 9 there is presented an illustration of a fourth preferred embodiment of the present invention showing an enlarged detail of the area of one thin-ferromagnetic-film layer 100. In this arrangement there is provided a glass substrate 102 upon which is superposed a magnetizable mask 104 having a rectangular aperture 106 therethrough for defining the planar contour of thin-ferromagnetic-film layer 100. Magnetizable mask 104 is shown as having a flux pattern in the area of aperture 106 whereby there is provided an orienting field passing from opposing surfaces 108, 109. This arrangement utilizes the magnetizable mask 104 as the means for defining the periphery of the associated thin-ferromagnetic-film layer 100, the arrangement not utilizing an additional masking element.

Figure 10:
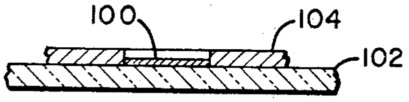
FIG. 10 is an illustration of a cross-sectional view of the embodiment of FIG. 9 taken along axis 10—10.

With particular reference to FIG. 10 there is presented an illustration of a cross-sectional view of the embodiment of FIG. 9 taken along axis 10—10 to illustrate the superposed relationship of substrate 102, magnetizable mask 104 and the resulting thin-ferromagnetic-film layer 100. This view particularly illustrates that the opposing edges of aperture 106 in magnetizable mask 104 determine the planar contour of thin-ferromagnetic-film layer 100.

Figure 11:
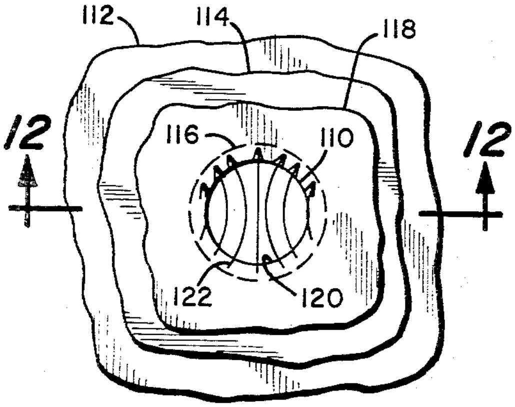
FIG. 11 is an illustration of a fifth preferred embodiment of the present invention showing only an enlarged detail of the area of one thin-ferromagnetic-film layer.

With particular reference to FIG. 11 there is presented an illustration of a fifth preferred embodiment of the present invention showing only an enlarged detail of the area of one thin-ferromagnetic-film layer 110. This arrangement includes the superposed glass substrate 112, magnetizable mask 114 having an aperture 116 therethrough and nonmagnetizable mask 118 having an aperture 120 therethrough which defines the planar contour of thin-ferromagnetic-film layer 110. In this arrangement magnetizable mask 114 is illustrated as having an upward, curved magnetic flux orientation which in the area of thin-ferromagnetic-film layer 110 provides an orienting magnetic field 122 having the illustrated flux pattern.

Figure 12:
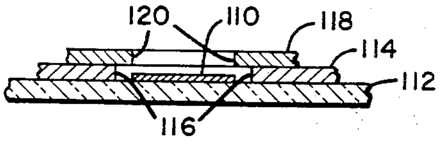
FIG. 12 is an illustration of a cross-sectional view of the preferred embodiment of FIG. 11 taken along axis 12—12.

With particular reference to FIG. 12 there is presented an illustration of a cross-sectional view of the arrangement of FIG. 11 taken along axis 12—12. This view particularly illustrates the superposed orientation of glass substrate 112, magnetizable mask 114 and nonmagnetizable mask 118 wherein aperture 120 in non-magnetizable mask 118 defines the planar contour of thin-ferromagnetic-film layer 110 within aperture 116 of magnetizable mask 114.

Figure 13:
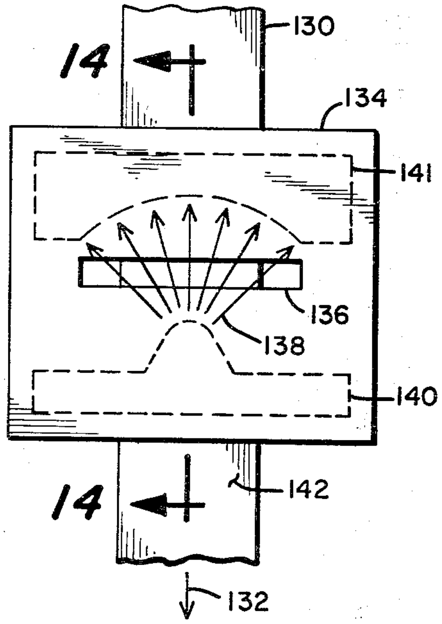
FIG. 13 is an illustration of a sixth preferred embodiment of the present invention for providing a large magnetic dispersion on a moving magnetic tape.

With particular reference to FIG. 13 there is presented an illustration of a sixth preferred embodiment of the present invention for providing a large magnetic easy axis dispersion in a thin-ferromagnetic-film layer deposited upon a moving tape substrate member with Mylar tape 130 moving in the direction designated by arrow 132. The metalized vapor is directed generally perpendicular to the top surface of a nonmagnetizable, such as copper, mask 134 passing through slot 136 therein. As the metalized vapor passes through slot 136 in mask 134 it is affected by the radial orienting field 138 generated by the opposing concentric arcuate surfaces of magnetizable strips 140, 141. There is established on the top surface of tape 130 a thin-ferromagnetic-film layer 142 having the everywhere uniformly varying magnetic easy axis dispersion of the radial orienting field 138 in the area of slot 136. This everywhere varying magnetic easy axis dispersion is similar to that discussed previously with particular reference to FIG. 6.

Figure 14:
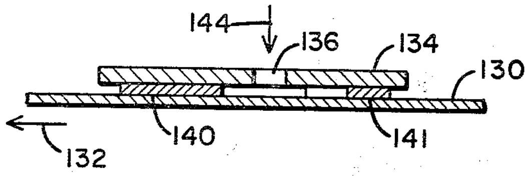
FIG. 14 is an illustration of a cross-sectional view of the embodiment of FIG. 13 taken along axis 14—14.

With particular reference to FIG. 14 there is presented an illustration of a cross-sectional view of the embodiment of FIG. 13 taken along axis 14—14 to illustrate the superposed relationship of the elements thereof. This view particularly illustrates the manner in which metalized vapor 144 passing through slot 136 in nonmagnetizable mask 134 is deposited upon the moving tape 130 between the opposing surfaces of magnetizable strips 140, 141.

Applicant has in his illustrated embodiments indicated several methods and apparatus for producing in a vacuum deposition environment thin-ferromagnetic-film layers having preferred axes of magnetization that are determined by orienting fields provided by magnetizable elements that are associated with each of the layers. Accordingly, it is to be appreciated that applicant's inventive concept is not to be limited to the specific embodiments presented but is to extend to any method and apparatus incorporating the inventive concept of the present invention. It is, therefore, understood that suitable modifications may be made in the structures disclosed provided such modifications come within the spirit and scope of the appended claims. Having now, therefore, fully illustrated and described my invention, what I claim to be new and desire to protect by Letters Patent is set forth in the appended claims.

I claim:

1. A mask assembly for defining the planar contour and the magnetic field anisotropy orientation of a magnetizable element having single domain properties, comprising:

a substrate member upon which a magnetizable element is to-be-deposited;

a first group of spaced-apart parallel planar, nonmagnetizable strips;

a second group of spaced-apart parallel, planar, magnetizable strips;

said first and second groups of strips arranged in a superposed relationship above said substrate member, the opening between said first and second groups of strips defining the planar contour of said to-be-deposited magnetizable element;

the strips of said second group providing in the area of said opening a locally controlled magnetic orienting field having an orientation that defines the magnetic field anisotropy orientation that is to be established in said to-be-deposited magnetizable element.

2. The mask assembly of claim 1 wherein said first and second groups are oriented orthogonally providing in the area of said opening a substantially parallel locally controlled magnetic orienting field.

3. A mask assembly for defining the planar contour and the magnetic field anisotropy orientation of a magnetizable element having single domain properties, comprising:

a magnetizable base member having a post rising from the top surface thereof;

a nonmagnetizable substrate member having an aperture therethrough, said substrate member superposed the top surface of said base member with said post of said base member substantially centered within the said aperture in said substrate member;

a high permeability mask member having an aperture therethrough, said mask member superposed said substrate member and said base member with the said post of said base member substantially centered within the said aperture in said mask member;

the aperture in said mask member defining the outer periphery and the aperture in said substrate member defining the inner periphery of a to-be-deposited magnetizable element on said substrate member;

the planar contour of said post and said aperture in said mask member providing controlled contours for defining the orientation of the magnetic field flowing therebetween for providing a locally controlled magnetic orienting field having an orientation that defines the magnetic field anisotropy orientation that is to be established in said to-be-deposited magnetizable element.

4. The mask assembly of claim 3 wherein the planar contours of said post and of said apertures in said mask member and in said substrate member are concentric circles for defining a washer-like to-be-deposited magnetizable element and said locally controlled magnetic orienting field as a radial field.

5. A mask assembly for defining the planar contour and the magnetic field anisotropy orientation of a magnetizable element having single domain properties, comprising:

a nonmagnetizable substrate member upon which a magnetizable element is to-be-deposited;

a group of spaced-apart, planar magnetizable strips superposed said substrate member;

a nonmagnetizable mask member superposed said group of magnetizable strips and having an aperture therethrough for defining the planar contour of said to-be-deposited magnetizable element;

adjacent strips of said group of magnetizable strips having, on opposing edges in the area of said aperture in said mask member, controlled contours for defining the orientation of the magnetic field flowing between said opposing edges for providing a locally controlled magnetic orienting field having an orientation that defines the magnetic field anisotropy orientation that is to be established in said to-be-deposited magnetizable element.

6. The mask assembly of claim 5 wherein the controlled contours of the opposing edges of said adjacent strips are arcs of concentric circles for causing said locally controlled magnetic orienting field to be a radial field in the area of said to-be-deposited magnetizable element.

7. A mask assembly for defining the planar contour and the magnetic field anisotropy orientation of a magnetizable element having single domain properties, comprising:

a substrate member upon which a magnetizable element is to-be-deposited;

a mask member superposed said substrate member and having an aperture therethrough for defining the planar contour of said to-be-deposited magnetizable element and including in the area of said to-be-deposited magnetizable element locally arranged magnetizable material for providing a controlled magnetic orienting field thereacross having an orientation that defines the magnetic field anisotropy orientation that is to be established in said to-be-deposited magnetizable element.

8. The mask assembly of claim 7 wherein said aperture in said mask member is of a substantially rectangular planar contour providing in the area of said aperture a substantially parallel locally controlled magnetic orienting field.

9. A mask assembly for defining the planar contour and the magnetic field anisotropy orientation of a magnetizable element having single domain properties, comprising:

a nonmagnetizable substrate member upon which a magnetizable element is to-be-deposited;

a nonmagnetizable mask member superposed said substrate member and having an aperture therethrough for defining the planar contour of said to-be-deposited magnetizable element;

sandwiched between said substrate member and said mask member magnetizable material locally arranged in the area of said aperture for providing a locally controlled magnetic orienting field thereacross having an orientation that defines the magnetic field anisotropy orientation that is to be established in said to-be-deposited magnetizable element.

References Cited

UNITED STATES PATENTS

| | | | |
|---|---|---|---|
| 3,131,078 | 4/1964 | Fuller et al. | 118—49.1 X |
| 3,286,690 | 11/1966 | McGlasson et al. | 118—504 |
| 3,353,169 | 11/1967 | Halverson | 340—174 |
| 3,357,004 | 12/1967 | Bergman et al. | 340—174 |
| 3,354,445 | 11/1967 | Prohofsky et al. | 340—174 |

OTHER REFERENCES

Anacker: "Memory Elements Using Slotted Magnetic Flms," IBM Technical Disclosure Bulletin, vol. 9, No. 5, October 1966, pp. 505–507.

Bertin: "High Performance, Closed Easy Axis Structure," IBM Technical Disclosure Bulletin, vol. 8, No. 9, February 1966, p. 1263.

Stapper Jr.: "Flexible Magnetic Keeper for Thin-Film Memories," IBM Technical Disclosure Bulletin, vol. 8, No. 10, March 1966, p. 1411.

CHARLES A. WILLMUTH, *Primary Examiner.*

MORRIS KAPLAN, *Assistant Examiner.*